United States Patent
Laviste et al.

(10) Patent No.: US 9,546,295 B2
(45) Date of Patent: Jan. 17, 2017

(54) TIRE AND TRIM DRESSING

(71) Applicant: Turtle Wax, Inc., Willowbrook, IL (US)

(72) Inventors: Rodel C. Laviste, Chicago, IL (US); Daren Kord Herbert, Naperville, IL (US)

(73) Assignee: Turtle Wax, Inc., Addison, IL (US)

( * ) Notice: Subject to any disclaimer, the term of this patent is extended or adjusted under 35 U.S.C. 154(b) by 158 days.

(21) Appl. No.: 14/577,081

(22) Filed: Dec. 19, 2014

(65) Prior Publication Data
US 2016/0177121 A1   Jun. 23, 2016

(51) Int. Cl.
C09D 125/14  (2006.01)
C09D 5/02   (2006.01)
C09D 5/14   (2006.01)
C08K 5/00   (2006.01)

(52) U.S. Cl.
CPC ........... C09D 125/14 (2013.01); C08K 5/0058 (2013.01); C09D 5/02 (2013.01); C09D 5/14 (2013.01)

(58) Field of Classification Search
CPC .......................... C09D 125/14; C09D 123/30
See application file for complete search history.

(56) References Cited

U.S. PATENT DOCUMENTS

| | | | | |
|---|---|---|---|---|
| 3,306,869 A * | 2/1967 | Lahr | ......... | C09G 1/10 106/10 |
| 3,467,610 A * | 9/1969 | Fiarman | ......... | C09D 125/14 106/10 |
| 3,557,989 A * | 1/1971 | Balda | ......... | B65D 41/045 215/261 |
| 4,094,841 A * | 6/1978 | Mani | ......... | C08F 2/44 524/748 |
| 4,151,138 A * | 4/1979 | Citrone | ......... | C09G 1/10 427/221 |
| 5,017,221 A | 5/1991 | Legrow et al. | | |
| 5,149,591 A | 9/1992 | Patitsas et al. | | |
| 5,378,271 A | 1/1995 | Arimoto et al. | | |
| 5,383,965 A * | 1/1995 | Carmine | ......... | C08K 5/10 106/287.24 |
| 5,432,217 A | 7/1995 | O'Lenick | | |
| 5,844,007 A | 12/1998 | Kijima et al. | | |
| 5,872,162 A | 2/1999 | McHugh et al. | | |
| 5,989,640 A | 11/1999 | Kijima et al. | | |
| 6,136,286 A * | 10/2000 | Okuyama | ......... | C09C 1/56 423/449.1 |
| 7,368,147 B2 | 5/2008 | Bell | | |
| 7,745,511 B2 | 6/2010 | Okamatsu et al. | | |
| 8,148,448 B2 | 4/2012 | Takahara et al. | | |
| 8,383,564 B2 | 2/2013 | Farning et al. | | |
| 8,440,751 B2 * | 5/2013 | Kohnke | ......... | C08K 5/521 106/11 |
| 8,513,331 B2 | 8/2013 | Okamatsu et al. | | |
| 8,623,454 B2 | 1/2014 | Huang | | |
| 2002/0147258 A1 * | 10/2002 | Yarmey | ......... | C09G 1/04 524/262 |
| 2002/0173576 A1 * | 11/2002 | Gwin | ......... | C09G 1/10 524/487 |
| 2004/0131787 A1 * | 7/2004 | Fang | ......... | B29D 30/0061 427/385.5 |
| 2007/0010607 A1 | 1/2007 | Smith et al. | | |
| 2007/0037711 A1 * | 2/2007 | Pluta | ......... | A01N 25/10 504/358 |
| 2008/0241371 A1 * | 10/2008 | Havelka | ......... | C09D 5/008 427/154 |
| 2009/0143502 A1 | 6/2009 | Obie | | |
| 2009/0297796 A1 | 12/2009 | Menoud et al. | | |
| 2009/0324936 A1 * | 12/2009 | Kim | ......... | C08F 36/04 428/335 |
| 2010/0130640 A1 | 5/2010 | Okamatsu et al. | | |
| 2012/0041099 A1 | 2/2012 | Takahara | | |
| 2012/0082791 A1 * | 4/2012 | Liversage | ......... | C09D 133/08 427/282 |

FOREIGN PATENT DOCUMENTS

JP   2012-046737 A   3/2012

OTHER PUBLICATIONS

Degussa (Smart Formulating Journal. Degussa. Oct. 14, 2005, 8 pages).*

* cited by examiner

*Primary Examiner* — Brieann R Fink
(74) *Attorney, Agent, or Firm* — Olson & Cepuritis, Ltd.

(57) ABSTRACT

A dressing suitable for tires and plastic automotive trim is an alkaline, aqueous emulsion, free from silicone oil, and contains a non-film forming acrylic polymer, an oxidized polyethylene wax, tributoxyethyl phosphate, hydrophilic carbon black, a non-ionic surfactant, and a biocide. The dressing, when applied to a tire or plastic automotive trim produces a lasting, luxurious luster.

16 Claims, No Drawings

TIRE AND TRIM DRESSING

FIELD OF INVENTION

This invention relates to an aqueous tire and automotive plastic trim dressing composition suitable for application to vehicle tires, bicycle tires, vehicle plastic trim, and the like.

BACKGROUND OF INVENTION

Conventional tire and plastic trim dressing compositions contain silicone oils in petroleum distillates or as water emulsions. While such tire dressing compositions, when applied to the sidewall of a tire produce a shiny appearance, these dressings attract dirt and dust, require frequent cleaning, and must be re-applied regularly. Such dressings also are relatively short lived and are readily removed from the sidewall in a rainstorm or during washing of the vehicle.

Accordingly, there exists a need for a tire dressing that provides long-lasting shine, is easy to apply, and does not attract dirt. The present dressing composition satisfies this need and provides a composition that enhances appearance but does not attract dirt and the like.

SUMMARY OF INVENTION

A durable dressing composition for tires and plastic automotive trim comprises an alkaline, aqueous emulsion, free from silicone oil, and containing a non-film forming acrylic polymer, an oxidized polyethylene wax, hydrophilic carbon black particles, tributoxyethyl phosphate, a non-ionic surfactant, and a biocide. The dressing composition can also contain an ultraviolet (UV) absorber, a light stabilizer, a defoamer, and a deaerator.

The dressing composition preferably has a solids content of about 20 to about 40 weight percent, a pH value in the range of about 8 to about 10, and a viscosity of no more than about 5 centipoises (cp) at 25° C.

BRIEF DESCRIPTION OF PREFERRED EMBODIMENTS

Upon application to tires or plastic automotive trim the present composition imparts a deep and lasting black shine that withstands repeated washing. This is achieved by a combination of constituents that include, in the form of an emulsion or latex, a non-film forming acrylic polymer, an oxidized polyethylene wax, and a carbon black, which, together with tributoxyethyl phosphate, bond to the substrate such as sidewall rubber, plastic car panels, and the like.

As used herein, a "non-film forming acrylic polymer" is an acrylic polymer that does not form a continuous, dry film from a latex emulsion because the resistance of deformation of the polymeric latex particles present is greater than the capillary forces between those polymeric latex particles. A "non-film forming acrylic polymer," as used herein, preferably has a glass transition temperature (Tg) higher than 50° C., preferably at least 70° C., as determined by differential scanning calorimetry (DSC).

Non-film forming acrylic polymers suitable for purposes of the present composition are commercially available as emulsions or latices. Anionic acrylic polymers are preferred for stable compositions, and provide the desired alkalinity. Illustrative anionic acrylic polymers, suitable for use in present compositions, are available from BASF Corporation, Florham Park, N.J., under the JONCRYL® designation, such as JONCRYL® 89 (Tg 98° C.), JONCRYL® 538-A (Tg 64° C.), JONCRYL® 631 (Tg 107° C.), JONCRYL® 1163 (Tg 105° C.), JONCRYL® 1655 (Tg 108° C.), JONCRYL® 1680 (Tg 56° C.), JONCRYL® 2153 (Tg 75° C.), JONCRYL® 2156 (Tg 105° C.), and the like. Particularly preferred for present compositions is the ammonium salt of styrene-acrylate copolymer commercially available under the designation JONCRYL® 2153, and the like copolymers that include styrene or an alkyl-substituted styrene in an amount of about 5 to 45 weight percent, based on the total weight of the copolymer.

The non-film forming acrylic polymer can be present in the dressing compositions in the range of about 7 to about 12 percent by weight, preferably about 8 to about 11 percent by weight, based on the total weight of the composition.

The oxidized polyethylene wax coacts with the non-film forming acrylic polymer, tributoxyethyl phosphate and carbon black particles to produce a long lasting shine on the tire or plastic trim substrate. The present composition can be applied to the substrate repeatedly without undesirable buildup.

Oxidized polyethylene waxes are known as such and are commercially available. These waxes are generally produced by the oxidation of high density or low density polyethylene using air or pure oxygen, and are characterized by a polyethylene structure formed by recurring ethylene ($-CH_2-CH_2-$)$_n$, groups and pendant carboxy groups and/or hydroxy groups. A preferred oxidized polyethylene wax suitable for present compositions is commercially available from Interpolymer Corporation, Canton, Mass., under the designation SYNTRAN 6170 W/E in the form of a water-based dispersion containing 33 to 34 percent by weight oxidized polyethylene wax having a molecular weight in excess of 2,800.

Dressing compositions contain about 6 to about 10 percent by weight, preferably about 7 to 8 percent by weight, of the oxidized polyethylene wax, based on the total weight of the composition.

The relative amounts of the non-film forming acrylic polymer and the oxidized polyethylene wax can vary depending on intended end use and the solids content of the aqueous emulsion. Preferably, the weight ratio of the non-film forming acrylic polymer to the oxidized polyethylene wax is in the range of about 1:2 to about 2:1, more preferably about 1:1.

Tributoxyethyl phosphate (TBEP) is organophosphate having the chemical formula $[CH_3(CH_2)_3OCH_2CH_2O]_3$ P(O) and is commercially available from a wide variety of sources. In the present compositions TBEP serves as a binder and is present preferably in an amount in the range of about 0.5 to 1.5 percent by weight of the composition, more preferably about 0.8 percent by weight of the composition.

Carbon black serves as a pigment and is incorporated into the present compositions as a hydrophilic carbon black dispersion preferably in an amount in the range of about 0.1 to about 1 percent by weight of the composition, more preferably about 0.4 percent by weight of the composition. Aqueous hydrophilic carbon black dispersions are commercially available with the carbon particles thereof coated with a hydrophilic substance, e.g., as acrylic-coated carbon black particles, and the like. Alternatively, carbon black particles may be oxidized by liquid phase oxidation or gas phase oxidation to impart hydrophilicity by providing hydrophilic functional groups, such as carboxyl groups and/or hydroxyl groups on the surface of the carbon particles.

An aqueous, acrylic-coated carbon black dispersion well suited for use in the present dressing compositions is commercially available from Emerald Performance Materials, LLC, Cuyahoga Falls, Ohio under the product designation 6C11B17045.

The present dressing compositions also include a non-ionic surfactant as well as a biocide.

The compositions contain about 0.1 percent by weight to 1 percent by weight, preferably from about 0.4 percent by weight to about 0.6 percent by weight, and more preferably about 0.5 percent by weight of the composition of a surfactant. Preferred surfactants for use herein include siloxane surfactants. Surfactant provides a low surface tension that permits the composition to spread readily and more uniformly on hydrophobic surfaces. The spreading of the composition also allows it to dry faster, making the treatment more efficient. The surfactant for use herein should be compatible with other components in the composition.

Suitable siloxane surfactants for use herein are the polyalkyleneoxide polysiloxanes having a dimethyl polysiloxane hydrophobic moiety and one or more hydrophilic polyalkylene side chains and have the general formula:

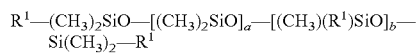

wherein a+b are from about 1 to about 50, alternatively from about 3 to about 30, alternatively from about 10 to about 25, and each $R^1$ is the same or different and is selected from the group consisting of methyl and a poly(ethyleneoxide/propyleneoxide) copolymer group having the general formula:

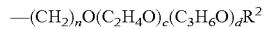

with at least one $R^1$ being a poly(ethyleneoxide/propyleneoxide) copolymer group, and wherein n is 3 or 4, alternatively 3; total c (for all polyalkyleneoxide side groups) has a value of from about 1 to about 100, alternatively from about 6 to about 100; total d is from 0 to about 14, alternatively from 0 to about 3; and alternatively d is 0; total c+d has a value of from about 5 to about 150, alternatively from about 9 to about 100 and each $R^2$ is the same or different and is selected from the group consisting of hydrogen, an alkyl having 1 to 4 carbon atoms, and an acetyl group, alternatively hydrogen and methyl group.

Examples of preferred surfactants are the silylated organic surfactant blends such as Silwet® Hydrostable 68, 611, and 212 available from Momentive Performance Materials, Albany, N.Y. Other representative Silwet surfactants are:

| Name | Average MW | Average a + b | Average total c |
|------|------------|---------------|-----------------|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Alternatively, the molecular weight of the polyalkyleneoxy group is less than or equal to about 8,000, and alternatively ranges from about 300 to about 5,000. Thus, the values of c and d can be those numbers which provide molecular weights within these ranges. However, the number of ethyleneoxy units ($-C_2H_4O$) in the polyether chain ($R^1$) must be sufficient to render the polyalkyleneoxide polysiloxane water dispersible or water soluble. If propyleneoxy groups are present in the polyalkyleneoxy chain, they can be distributed randomly in the chain or exist as blocks. Besides surface activity, polyalkyleneoxide polysiloxane surfactants can also provide other benefits, such as antistatic benefits, lubricity and the like.

The preparation of polyalkyleneoxide polysiloxanes is well known in the art. Polyalkyleneoxide polysiloxanes suitable for the present compositions can be prepared according to the procedure set forth in U.S. Pat. No. 3,299,112.

Suitable biocides can be non-ionic biocides, anionic biocides, or cationic biocides, and can be present in an amount in the range of about 0.1 to about 0.2 percent by weight of the composition.

Illustrative non-ionic biocides are 1,2-benzisothiazolin-3-one, blend of 5-chloro-2-methyl-4-isothiazolin-3-one and 2-methyl-4-isothiazolin-3-one, 2-hydroxypropylmethane thiosulfonate, and the like.

Illustrative anionic biocides are anionic potassium N-hydroxymethyl-N-methyldithiocarbamate, sodium dichlorophene, and the like.

Illustrative cationic biocides are cationic poly[oxyethylene(dimethylamino)-ethylene(dimethylamino)ethylene dichloride], a cationic blend of methylene bisthiocyanate and dodecyl guanidine hydrochloride, a cationic blend of methylene bisthiocyanate.

As biocide for the present dressing compositions particularly preferred are the non-ionic biocides in general and 1,2-benzisothiazolin-3-one in particular.

Preferably, the present dressing compositions also include an ultraviolet (UV) absorber and a light stabilizer, each in an amount in the range of about 0.009 to about 0.015 percent by weight of the composition.

Illustrative UV absorbers are the hydroxyphenyl benzotriazoles such as mixtures of the $C_1$ and $C_7$-$C_9$ branched alkyl esters of 3-(2H-benzotriazol-2-yl)-5-(1,1-dimethylethyl)-4-hydroxybenzenepropionic acid, 2-(2-hydroxyphenyl)benzotriazole, and the like, the 2-hydroxyphenyl benzophenones such as [2-hydroxy-4-(octyloxy)phenyl]phenyl methanone, 2,4-dihydroxybenzophenone, and the like, the 2-hydroxyphenyl-s-triazines such as 2-[2-hydroxy-4-[3-(2-ethylhexyl-1-oxy)-2-hydroxypropyloxy]phenyl]-4,6-bis(2,4-dimethylphenyl)-1,3,5-triazine, and the like.

Illustrative light stabilizers are the hindered amine light stabilizers such as bis(1,2,2,6,6-pentamethyl-4-piperidinyl) sebacate, 1-(methyl)-8-(1,2,2,6,6-pentamethyl-4-piperidinyl)sebacate, mixtures of the foregoing, bis(1-octyloxy-2,2,6,6-tetramethyl-4-piperidinyl)sebacate, 2,4-bis[(1-cyclohexyloxy-2,2,6,6-tetramethylpiperidin-4-yl) butylamino]-6-(2-hydroxyethylamino)-s-triazine, and the like.

Further optional components can be a defoamer, a deaerator, and a leveling agent. These components preferably are polyethersiloxane based compounds.

Suitable defoamers are the polysiloxanes such as the emulsions of organo-modified polysiloxanes containing fumed silica and commercially available from Evonik Corporation, Hopewell, Va., under the designation TEGO® FOAMEX 825, and the like. Other suitable defoamers and their manufacture are described in U.S. Patent Publication No. 2013/0035409 A1 and U.S. Pat. No. 3,666,681 to Keil.

Suitable deaerators are the polyethersiloxanes such as the polyether-siloxane emulsions commercially available from Evonik Corporation, Hopewell, Va., under the designation TEGO® AIREX 902 W, and the like.

Suitable leveling agents are polyethersiloxanes such as the polyether dimethylsiloxane copolymers (CAS No.

157479-55-5) commercially available from Evonik Corporation, Hopewell, Va., under the designation TEGO® GLIDE 450, and the like.

Yet another optional component of the present compositions is an aesthetic aid such as a fragrance which can be added in a quantity sufficient to mask the odors of the other components.

A preferred tire dressing composition is illustrated in the Example below.

EXAMPLE

Tire Dressing

| Component | Vol-% | Wt-% Solids |
|---|---|---|
| Emulsion of ammonium salt of styrene-acrylate copolymer[1] | 22 | 11 |
| Oxidized polyethylene wax emulsion[2] | 19 | 7.6 |
| Tributoxyethyl phosphate | 0.15 | 0.15 |
| Aqueous carbon black dispersion[3] | 0.75 | 0.42 |
| Non-ionic surfactant[4] | 0.5 | 0.5 |
| Biocide[5] | 0.15 | 0.15 |
| UV absorber[6] | 0.01 | 0.01 |
| Light stabilizer[7] | 0.01 | 0.01 |
| Defoamer[8] | 0.25 | 0.065 |
| Deaerator[9] | 0.25 | 0.06 |
| Leveling agent[10] | 0.15 | 0.15 |
| Fragrance[11] | 0.05 | — |
| Water (deionized) | q.s. to 100 | — |

[1] JONCRYL® 2153, BASF Corp., Florham Park, NJ
[2] SYNTRAN® 6170 W/E, Interpolymer Corp., Canton, MA
[3] 6C11B17045, Emerald Performance Mat'ls, LLC, Cuyahoga Falls, OH
[4] SILWET HYDROSTABLE 212, Momentive Performance Mat'ls, Inc., Albany, NY
[5] PROXEL GXL, Arch Chemicals, Inc., Smyrna, GA
[6] TINUVIN® 99, BASF Corp., Florham Park, NJ
[7] TINUVIN® 292, BASF Corp., Florham Park, NJ
[8] TEGO® FOAMEX 825, Evonik Corp., Hopewell, VA
[9] TEGO® AIREX 902 W, Evonik Corp., Hopewell, VA
[10] TEGO® GLIDE 450, Evonik Corp., Hopewell, VA
[11] Raspberry #56159, Belle-Aire Fragrances, Mundelein, IL The above tire dressing composition has a solids content of about 20 percent by weight, a pH value of about 9.5, specific gravity of about 0.996, and viscosity of about 1 cp at 25° C.

In use, the present tire dressing is applied from a foam applicator pad. An aliquot of the tire dressing composition is poured onto the pad, and a coating of the tire dressing composition is applied to a tire sidewall, preferably in a continuous wiping motion, and permitted to dry for about 5 to 10 minutes. A luxurious, durable, rich luster on the sidewall is achieved in this manner. For higher shine, application of the tire dressing may be repeated one or more times.

The present tire dressings are prepared by first combining, with stirrng, the non-film forming acrylic polymer emulsion with cold water (preferably deionized water) and a defoamer, and thereafter adding in the rest of the constituents with continued stirring. Agitation of the resulting admixture if continued for about 30 minutes to achieve a liquid composition uniform in appearance and consistency.

The foregoing description and the example are illustrative and are not to be taken as limiting. Other variations of components and relative amounts thereof are possible and will readily present themselves to those skilled in the art.

We claim:

1. A dressing composition suitable for tires and plastic automotive trim comprises an alkaline, aqueous emulsion, free from silicone oil, and containing a non-film forming acrylic polymer, an oxidized polyethylene wax, tributoxyethyl phosphate, hydrophilic carbon black, a non-ionic surfactant, and a biocide wherein
   the non-film forming acrylic polymer is present in an amount in the range of about 7 to about 12 percent by weight of the composition;
   the oxidized polyethylene wax is present in an amount in the range of about 6 to about 10 percent by weight of the composition;
   the tributoxyethyl phosphate is present in an amount in the range of about 0.5 to about 1.5 percent by weight of the composition;
   the hydrophilic carbon black is present in an amount in the range of about 0.1 to about 1 percent by weight of the composition;
   the non-ionic surfactant is present in an amount in the range of about 0.1 to about 1 percent by weight of the composition; and
   the biocide is present in an amount in the range of about 0.1 to about 0.2 percent by weight of the composition.

2. The dressing composition in accordance with claim 1 further containing an ultraviolet absorber and a light stabilizer.

3. The dressing composition in accordance with claim 1 having a solids content in the range of about 20 weight percent to about 40 weight percent, a pH value in the range of about 8 to about 10, and a viscosity of no more than about 5 centipoise at 25° C.

4. The dressing composition in accordance with claim 1 wherein the weight ratio of the non-film forming acrylic polymer to the oxidized polyethylene wax is in the range of about 1:2 to about 2:1 and tributoxyethyl phosphate is present in an amount in the range of about 0.5 to about 1 percent by weight, based on the total weight of the composition.

5. The dressing composition in accordance with claim 1 wherein the hydrophilic carbon black is acrylic-coated carbon black.

6. The dressing composition in accordance with claim 5 wherein the acrylic-coated carbon black has a particle size in the range of about 8 to about 80 nanometers.

7. The dressing composition in accordance with claim 1 wherein the non-film forming acrylic polymer is an anionic copolymer.

8. The dressing composition in accordance with claim 1 wherein the non-film forming acrylic polymer is a styrene-acrylate copolymer.

9. The dressing composition in accordance with claim 1 wherein the non-film forming acrylic polymer is an ammonium salt of a styrene-acrylate copolymer.

10. The dressing composition in accordance with claim 1 wherein the non-ionic surfactant is a blend of polyalkylene oxide polysiloxanes.

11. The dressing composition in accordance with claim 1 wherein the biocide is a non-ionic biocide.

12. The dressing composition in accordance with claim 11 wherein the non-ionic biocide is 1,2-benzisothiazolin-3-one.

13. The dressing composition in accordance with claim 1 and further containing
   an ultraviolet absorber in an amount in the range of about 0.009 to about 0.015 percent by weight of the composition; and
   a light stabilizer in an amount in the range of about 0.009 to about 0.015 percent by weight of the composition.

14. The dressing composition in accordance with claim 13 wherein the ultraviolet absorber is hydroxyphenylbenzotriazole and the light stabilizer is a mixture of bis(1,2,2,6,6- pentamethyl-4-piperidinyl) sebacate and 1-methyl-8-(1,2,2,6,6-pentamethyl-4-piperidinyl) sebacate.

15. The dressing composition in accordance with claim 1 further including a defoamer, a deaerator, and a leveling agent.

16. A dressing composition suitable for tires and plastic automotive trim which comprises, based on the total weight of the composition,
 about 8 to 11 percent by weight of an ammonium salt of a styrene-acrylate copolymer;
 about 7 to 8 percent by weight of an oxidized polyethylene wax;
 about 0.8 percent by weight of tributoxyethyl phosphate;
 about 0.4 percent by weight of acrylic-coated carbon black;
 about 0.5 percent by weight of a surfactant blend comprising a polyalkylene oxide and a polyalkylene oxide silane;
 about 0.15 percent by weight of 1,2-benzoisothiazolin-3-one;
 about 0.065 percent by weight of a polyethersiloxane defoamer;
 about 0.06 percent by weight of a polyethersiloxane deaerator;
 about 0.15 percent by weight of a polyethersiloxane leveling agent; and
 deionized water.

* * * * *